United States Patent
Procter et al.

(10) Patent No.: US 10,922,610 B2
(45) Date of Patent: Feb. 16, 2021

(54) SYNCHRONIZATION SCHEDULER OF DISTRIBUTED NEURAL NETWORK TRAINING

(71) Applicant: Intel Corporation, Santa Clara, CA (US)

(72) Inventors: Adam Procter, Hillsboro, OR (US); Vikram Saletore, Hillsboro, OR (US); Deepthi Karkada, Hillsboro, OR (US); Meenakshi Arunachalam, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 826 days.

(21) Appl. No.: 15/704,668

(22) Filed: Sep. 14, 2017

(65) Prior Publication Data
US 2019/0080233 A1    Mar. 14, 2019

(51) Int. Cl.
*G06N 3/08*      (2006.01)
*G06N 20/00*     (2019.01)

(52) U.S. Cl.
CPC ............... *G06N 3/08* (2013.01); *G06N 20/00* (2019.01)

(58) Field of Classification Search
None
See application file for complete search history.

(56) References Cited

U.S. PATENT DOCUMENTS

| 8,103,606 | B2* | 1/2012 | Moussa ................. | G06N 3/063 |
| | | | | 706/31 |
| 10,152,676 | B1* | 12/2018 | Strom ...................... | G06N 3/08 |
| 2018/0121806 | A1* | 5/2018 | Haruki ................. | G06N 3/0454 |
| 2019/0325302 | A1* | 10/2019 | Savic ................... | G06F 9/44505 |
| 2020/0118000 | A1* | 4/2020 | Schmidt ................. | G06N 3/04 |

OTHER PUBLICATIONS

Das, Dipankar et al.; Distributed Deep Learning Using Synchronous Stochastic Gradient Descent; 10 pages. (Year: 2016).*
Chen, Jianmin et al.; Revisiting Distributed Synchronous SGD; ICLR 2017; pp. 1-10. (Year: 2017).*

* cited by examiner

*Primary Examiner* — Stanley K. Hill
(74) *Attorney, Agent, or Firm* — Jordan IP Law, LLC

(57) ABSTRACT

Systems, apparatuses and methods may provide for technology that conducts a first timing measurement of a blockage timing of a first window of the training of the neural network. The blockage timing measures a time that processing is impeded at layers of the neural network during the first window of the training due to synchronization of one or more synchronizing parameters of the layers. Based upon the first timing measurement, the technology is to determine whether to modify a synchronization barrier policy to include a synchronization barrier to impede synchronization of one or more synchronizing parameters of one of the layers during a second window of the training. The technology is further to impede the synchronization of the one or more synchronizing parameters of the one of the layers during the second window if the synchronization barrier policy is modified to include the synchronization barrier.

25 Claims, 11 Drawing Sheets

| Window | Synchronization Barrier Policy | Blockage Time By Layer [L1, L2, L3, L4] | Most Blocked Layer | Total Block Time | Delta Total Block Time |
|---|---|---|---|---|---|
| 0 | {} | [15ms, 3ms, 2ms, 1ms] | 1 | 21ms | n/a |
| 1 | {(1,2)} | [8ms, 3ms, 2ms, 1ms] | 1 | 14ms | -7 |
| 2 | {(1,2),(1,3)} | [4ms, 5ms, 1ms, 1ms] | 2 | 11ms | -3 |
| 3 | {(1,2),(1,3),(2,3)} | [4ms, 4.5ms, 3ms, 1ms] | 2 | 12.5ms | +1.5 |
| 4 | {(1,2),(1,3)} | [4ms, 5ms, 1ms, 1ms] | 2 | 11ms | -1.5 |
| 5 | {(1,2),(1,3),(2,3)} | [4ms, 4.5ms, 3ms, 1ms] | 2 | 12.5ms | +1.5 |
| 6 | {(1,2),(1,3)} | [4ms, 5ms, 1ms, 1ms] | 2 | 11ms | -1.5 |
| 7 | {(1,2),(1,3),(2,3)} | [4ms, 4.5ms, 3ms, 1ms] | 2 | 12.5ms | +1.5 |
| 8 | {(1,2),(1,3)} | [4ms, 5ms, 1ms, 1ms] | 2 | 11ms | -1.5 |
| 9 | {(1,2),(1,3),(2,3)} | [4ms, 4.5ms, 3ms, 1ms] | 2 | 12.5ms | +1.5 |
| ... | | | | | ... |

FIG. 6

SYNCHRONIZATION SCHEDULER OF DISTRIBUTED NEURAL NETWORK TRAINING

TECHNICAL FIELD

Embodiments generally relate to deep learning (DL) and deep neural networks (DNN). More particularly, embodiments relate to training a DNN.

BACKGROUND

A DNN may identify an input and apply a label to the input based upon the identification. For example, a DNN may receive an image and determine the type of object contained in the image, such as a cat or a dog. The DNN may be trained to identify such images through a process such as stochastic gradient descent.

BRIEF DESCRIPTION OF THE DRAWINGS

The various advantages of the embodiments will become apparent to one skilled in the art by reading the following specification and appended claims, and by referencing the following drawings, in which:

FIG. 6 is a table illustrating an example of the addition of synchronization barriers according to an embodiment;

DESCRIPTION OF EMBODIMENTS

Figure 1:
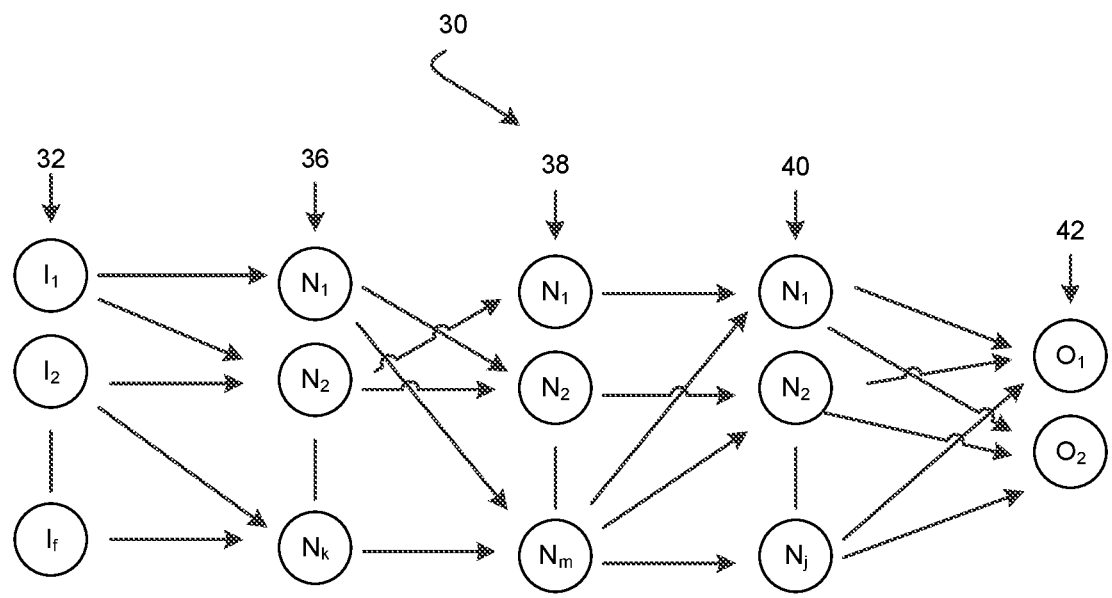
FIG. 1 is an illustration of an example of a DNN according to an embodiment.

FIG. 1 illustrates a DNN 30. The DNN 30 may be a convolution neural network (CNN). The DNN 30 may train using deep learning technology. For example, some CNN topologies include a neural network that includes multiple hidden layers of convolution, RELU (rectified linear unit), pooling, etc., which are used to extract features from input data and categorize them accordingly. While the below discusses images, it is to be understood that a DNN 30 may categorize different kinds of data, for example the input data may include images, sounds, videos, emails and other types of data to be classified. The DNN 30 may assign pixels forming an image, a label, such as a cat, dog, mouse etc. for identification. A DNN 30 may include a collection of computational units known as neurons $N_1$-$N_k$, $N_1$-$N_m$, $N_1$-$N_d$ arranged in layers 36, 38, 40. When presented with input data, each neuron $N_1$-$N_k$ of each layer 36, 38, 40 may perform forward processing, which produces an output activation value according to an activation function, which may be a function of the input data, and that utilizes weights and a bias term. In order to produce correct and useful outputs, for example labeling a picture by a correct identifier (e.g., cat), suitable values may be adjusted and assigned to the weights and biases of each neuron $N_1$-$N_k$, $N_1$-$N_m$, $N_1$-$N_d$ of the layers 36, 38, 40. The process of adjusting and assigning these values by reference to a set of images paired with ground-truth labels is known as training, and is part of deep learning technology. Training may be difficult, since the number of total neurons may be large, for example in the millions. Training the DNN 30 may take an excessively long time, for example weeks or months.

To improve efficiency, the training process may be scaled out over a large number of nodes (e.g., central processing units or computers) which each train a mini-batch of training images with ground-truth labels which may be connected through Ethernet, fabric or wireless connection. For example, a plurality of nodes may be provided, with each node including a DNN 30 and processing a different mini-batch of the training samples from the other nodes. During training, the different nodes may synchronize the neurons in a same layer with each other by exchanging and/or averaging parameters, which may also be referred to as synchronizing parameters.

For example, each node may include neurons $N_1$-$N_k$ in the layer 36. The neurons $N_1$-$N_k$ of the layer 36 of the nodes may synchronize with each other, for example by synchronizing parameters, such as gradients of the weights of the neurons $N_1$-$N_k$ of the layer 36 and biases of the neurons $N_1$-$N_k$ of the layer 36. Parameters may further include any trainable parameter within a neural network including the node. That is, the gradients of the weights may need to be updated based upon an average of the gradients and/or exchanged between the different nodes, and the gradients of the biases may need to be updated based upon an average of the gradients biases and used to calculate the new bias. Thus, each of the neurons $N_1$-$N_k$, $N_1$-$N_m$, $N_1$-$N_d$ of the layers 36, 38, 40 may be synchronized by averaging the gradients of parameters of that particular neuron across the layer 36, averaging those gradients, and adjusting the parameters based upon the average gradient.

As one example, each of the neurons $N_1$ of the layer 36 may synchronize by averaging the gradients of the parameters of the neurons $N_1$ of the layer 36 and using that average to determine new parameters for the neurons $N_1$ of the layer 36; and also averaging the biases of the neurons $N_1$ of the layer 36 and using that bias to determine a new bias for the neurons $N_1$ of the layer 36. Synchronization allows for building a single model utilizing an optimized set of parameters across all of the nodes. In a large scale (e.g., millions of neurons), delays caused during synchronization may be detrimental to performance. For example, to properly synchronize across the nodes, communication between the nodes may need to occur to communicate gradients of parameters to each other. If resources including hardware resources, for example computing processing units connected by fabric or wireless bandwidth, for such communication are limited, competition for such resources occurs, in which some layers 36, 38, 40 may receive less resources than other layers 36, 38, 40 for synchronization. For example, if the layer 40 begins synchronizing before the layer 36, then the layer 36 may receive little to no resources for synchronization until the layer 40 has completed synchronization.

Embodiments of the application relate to enhance training of DNNs 30 in which delays during synchronization may be reduced by properly allocating resources through prioritized scheduling of the highest priority layers 36, 38, 40. For example, the layer 36 of the nodes may be the highest priority layer out of the layers 36, 38, 40 because the layer 36 receives the inputs $I_1$-$I_f$ before the other layers 38, 40. As such if after first mini-batches have been processed by the DNNs 30, and the layer 36 is still synchronizing, second mini-batches cannot be processed by the DNNs 30 thereby causing a delay. The timing of the delay may be referred to as blockage time. In contrast, while the layer 40 is syncing, the layer 36 may be able to process the second mini-batch since the layer 36 does not require inputs from the layer 40 during forward propagation (i.e., in a direction from left to right) to process the second mini-batch. As such, efficiency may be enhanced by ensuring that the highest priority layer 36 is prioritized to receive resources so as to synchronize before other layers 38, 40 to avoid the aforementioned delay. Similarly, the layer 38 may be scheduled to synchronize before the layer 40 to avoid delays. While the above discussion relates to multi-node neural networks, it may also be possible to schedule synchronization of single-node neural networks. For example, single-node neural networks may need to be updated with reference to a system memory, and as such single-node networks may experience delays if the system memory resources are synchronizing lower priority layers to delay synchronization of higher priority layers. Therefore, in a single-node network resources may be allocated to highest priority layers during synchronization to avoid or minimize delays.

In an example, the DNN 30 of FIG. 1 may be trained using an algorithm called stochastic gradient descent (SGD). SGD may be utilized on a single node, and utilizes the notion that activation functions of neurons of a DNN, such as DNN 30, are differentiable with respect to their parameters. During training, mini-batches of data are provided to the DNN 30 through inputs $I_1$-$I_f$, the SGD may quantify how accurately the DNN 30 is able to classify the input via a differentiable loss or error function E. Part of this process is called forward propagation, and traverses in a direction from inputs $I_1$-$I_n$ to output layer 42 through the layers 36, 38, 40 with each layer providing outputs. The DNN then computes the gradients of the loss function E with respect to the current parameters (e.g., bias or weight) of the layers 36, 38, 40. The gradient of the loss function E may be represented by the following equation:

$$\frac{\partial}{\partial w}(E)$$

On the basis of the gradients, parameters are updated according to the following equation which is applied for each neuron $N_1$-$N_k$, $N_1$-$N_m$, $N_1$-$N_d$ of the layers 36, 38, 40:

$$w' = w - \theta \frac{\partial}{\partial w}(E)$$

In this equation, w' is the updated parameter, w is the parameter prior to adjustment and Θ is a tunable value called the learning rate.

Since each layer 36, 38 has an adjustment that is a differentiable function of the layer 38, 40 that precedes it during backward propagation, the gradient is computed layer-by-layer, moving from output layer 42 to input layer 32 in during the backward propagation, and the parameters in the network are adjusted according to the computed gradient. The biases are also adjusted during backward propagation. The process repeats for each iteration of mini-batches of images until the network has reached a satisfactory degree of accuracy relative to the ground truth.

Synchronous SGD may be utilized in a distributed network described above, in which a plurality of nodes each include a DNN 30 as illustrated in FIG. 1. Synchronous SGD works similarly to as described above with SGD, in which each node performs the SGD process above, but further that the computed gradients and biases must be synchronized and averaged across all the nodes and between image mini-batches or iterations. Each node of the synchronous SGD process trains on different mini-batches of data. After each iteration of training (which may include several mini-batches), the nodes' parameters may need to be synchronized by averaging gradients of the parameters of respective neurons. After a number of epochs (a pass over the entire data set) of data (e.g., images, sounds, etc.) has been processed, a convergence of parameters may occur in which the parameters are no longer substantially modified, thereby ending the training.

Figure 2:
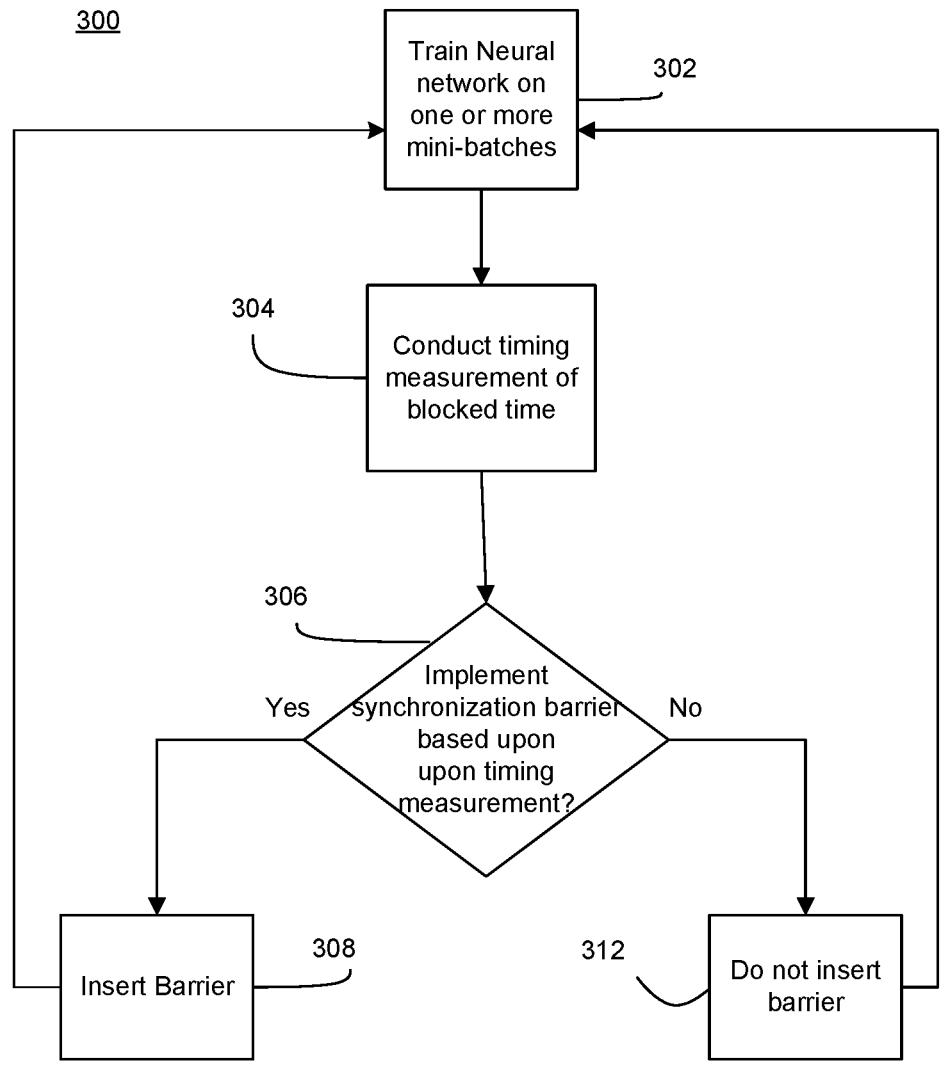
FIG. 2 is a flowchart of an example of a method of training a DNN according to an embodiment.

FIG. 2 shows a method 300 of training distributed DNNs, for example DNNs 30. The method 300 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field-programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 300 may be written in any combination of one or more programming languages, including RTL, object oriented programming languages such as JAVA, SMALLTALK, C++, CUDA or the like, and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 302 trains a neural network on one or more mini-batches of images. In some embodiments, a plurality of mini-batches may be trained by the neural network by illustrated processing block 302. The neural network may include DNNs. Illustrated processing block 304 conducts a timing measurement during synchronization. For example, the timing measurement or delay time may be the amount of blockage time layers of the DNNs are blocked. Blockage time may mean that forward propagation or processing of an iteration i is blocked because a layer is still synchronizing the parameters of that layer by averaging and exchanging the gradients of the parameters of the layer from iteration i−1. Each layer may be individually timed so that the respective timings of the layers are determined. Illustrated processing blocks 302, 304 may occur concurrently.

Illustrated processing block 306 may determine whether a synchronization barrier is to be implemented between layers during synchronization. A synchronization barrier may prevent, slow and/or impede a layer from synchronizing before another layer. For example, a synchronization barrier may stop a layer from synchronizing until another layer has completed synchronizing, and/or may allocate more resources to a layer for synchronization compared to another layer. To allocate resources, a quality of service mechanism or an explicit logic such as an FPGA, an ASIC or a co-processor may be utilized to ensure that a layer (e.g., layer one) has more access to resources for synchronization than other layers (layers two and three). Thus, by proper implementation of synchronization barriers, blockage time may be reduced. Blockage time may be the time that forward propagation is blocked because a particular layer is still synchronizing parameters, and therefore cannot process activation values to continue forward propagation.

For example, from the timing measurement, if it is clear that a higher priority layer has the most blockage time, then a synchronization barrier may be implemented between the higher priority layer and a lower priority layer so that the higher priority layer receives resources before the lower priority layer. If a synchronization barrier is to be implemented, illustrated processing block 308 may implement the synchronization barrier. The synchronization barrier may control synchronization timings of the layers, as well as synchronization resources.

If no synchronization barrier is to be implemented, illustrated processing block 312 may avoid implementation of any synchronization barrier. The method 300 then proceeds to illustrated processing block 302 in which the neural network is trained again on other mini-batches of data. The method 300 may then repeat beginning at illustrated processing block 304. In some embodiments, after a certain amount of mini-batches have been processed, the method 300 may end after illustrated processing block 302.

Figure 3:
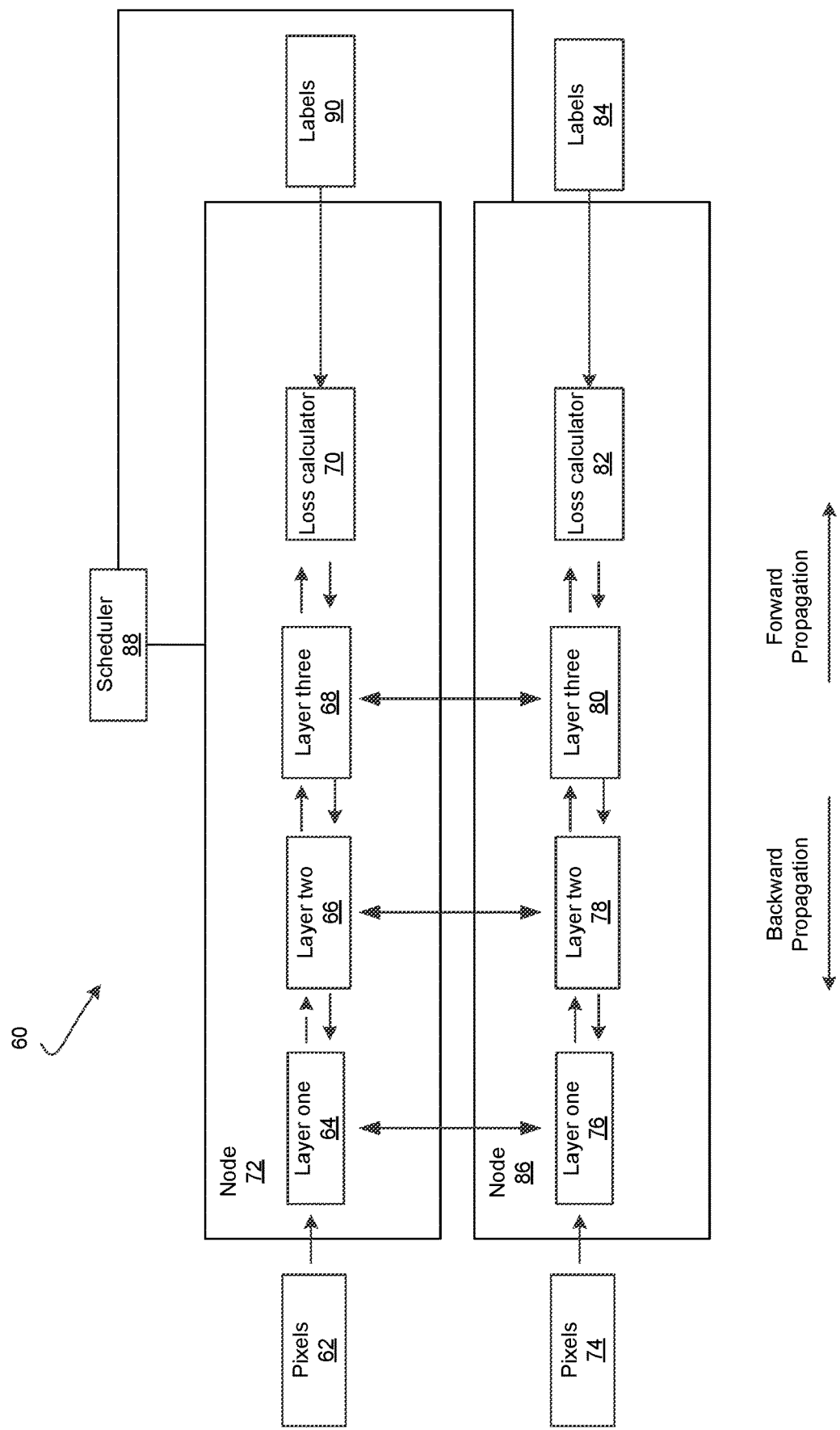
FIG. 3 is an illustration of an example of a DNN including a scheduler according to an embodiment.

FIG. 3 illustrates a distributed neural network 60 including two nodes 72, 86 and a scheduler 88. The scheduler 88 may be a part of the nodes 72, 86. In some embodiments, the scheduler 88 may operate to control the scheduling of only of the nodes 72, 86. In some embodiments, each node 72, 86 may include a different scheduler 88 which operates independently of the other schedulers 88. Thus, a consistent barrier scheduling policy (discussed below) does not necessarily need to be applied to each node 72, 86. This may allow for more flexible decisions to be made with respect to scheduling, since different nodes 72, 86 may have different resources available. Moreover, more than two nodes 72, 86 may be included and trained similarly to as described herein. While the nodes 72, 86 are illustrated as having three layers 64, 66, 68, 76, 78, 80, more layers may be included in the nodes 72, 86 and operate similarly to as described below.

Each of the nodes 72, 86 may include an architecture similar to that of the DNN 30 of FIG. 1, in which each of the layers one, two and three 64, 66, 68, 76, 78, 80 include neurons. For example, layer one 64 of the node 72 may correspond to layer 36 and include neurons $N_1$-$N_k$, and layer one 76 of the node 86 may correspond to another layer 36 and include neurons $N_1$-$N_k$. The nodes 72, 86 may be trained based upon mini-batches of 1, 2, 3, or higher dimensional input training samples (not restricted to images, but may include words, sentences, audio) and using a synchronous SGD process. For example, a group of images (e.g., 1,000,000 images) may be divided into mini-batches (e.g., each image mini-batch is thirty-two images), with the node 72 training on a first of the mini-batches and the node 86 training on a second of the mini-batches.

Forward and reverse propagation with respect to the node 72 during the synchronous SGD process is described, however the node 86 may include forward and reverse propagation similar to the node 72. During forward propagation, an image or images may be provided as pixels 62 for example, and labels 90 are also provided. The pixels 62 are provided to layer one 64. Layer one 64 processes the pixels according to the activation functions of layer one 64, and provides an output (e.g., activation values) to layer two 66. This may be referred to as forward processing. The output may include the activation values computed by layer one 64 through the activation functions of layer one 64. Layer two 66 processes the received activation values according to the activation functions of layer two 66, and outputs activation values layer three 86. Layer three 86 processes the received activation values according to activation functions and outputs activation values to loss calculator 70.

Thus, during forward propagation, processing occurs in the direction from left to right along the arrows. During forward propagation, the layers 66, 68 are dependent on forward inputs from the previous layer 64, 66, since each layer 66, 68 receives an output from the directly previous layer 64, 66. Since layer one 64 is the first layer to receive the pixel inputs 62, layer one 64 is not dependent on another layer during forward propagation.

Labels 90 are also provided to loss calculator 70. The loss calculator 70 may determine the loss during forward propagation. The loss may include a difference between an expected output (i.e., labels) and a provided output from layer three 68. During backward propagation (i.e., in a direction from right to left along the arrows) the gradient of the layer parameters with respect to the loss function may be determined, starting with the rightmost layer, which is layer three 68, and passing toward layer one 64 through layer two 66.

The parameters of the layers 64, 66, 68 may also be adjusted during backward propagation and based upon the gradient of the loss function. For example, and as described above, the gradient of the loss function E may be:

$$\frac{\partial}{\partial w}(E)$$

The parameters of each neuron $N_1$-$N_k$ of the layers 36, 38, 40 may be updated according to:

$$w' = w - \theta \frac{\partial}{\partial w}(E)$$

During backward propagation, processing occurs in the direction from right to left along the arrows. Backward propagation at any layer 64, 66 and so on is dependent on backward inputs from the previous layer 66, 68 since each layer 64, 66 receives an output from the directly previous layer 66, 68. Layer three 68 is the first layer to receive the output from the loss calculator 70, and therefore is not dependent on another layer.

The node 86 may similarly be trained on image mini-batches through forward and backward propagation as described above.

After the nodes' 72, 86 backward propagation is completed and before further training on image mini-batches occurs, the nodes 72, 86 may synchronize with each other as illustrated by the vertical arrows extending between the nodes 72, 86. The synchronization may occur via fabric, photonics or other forms of communication between the nodes 72, 86. Several mini-batches may be processed by each of the nodes 72, 86 before synchronization occurs between the nodes 72, 86.

As noted above, forward and backward propagations proceed in opposite directions from each other and each layer 64, 66, 68, 76, 78, 80 may need to receive an output from a previous layer during at least one of forward and backward propagation before processing. Synchronization may begin as soon as the respective layer 64, 66, 68, 76, 78, 80 has completed processing during backward propagation. Therefore, layers which process earlier during backward propagation, such as layers three 68, 80 may begin synchronization before other layers 64, 66, 76, 78. Layer one 64, 76 synchronizes last and at that time, the other layers 66, 78, 68, 80 may be utilizing most of the resources (e.g., fabric) for synchronization. That is, layer one 64, 76 may need to synchronize on slower fabric and/or receive less resources than the other layers 66, 78, 68, 80. This may cause delays during training, since the synchronization timings of layer one 64, 76 may be more time sensitive than that of the other layers 66, 78, 68, 80.

For example, layer one 64, 76 has the least amount of time between forward and backward propagations for synchronization. That is, layer one 64, 76 processes last during backward propagation, but processes first during forward propagation out of the layers 64, 66, 68, 76, 78, 80. This short window of time for synchronization between forward and backward propagation may cause delays between training on image mini-batches. For example, the nodes 72, 86 may each be trained on a respective first mini-batch of images and may need to be synchronized based upon the training. Training by the nodes 72, 86 on a second mini-batch of images cannot begin until the synchronization of layer one 64, 76 is completed. Therefore, forward propagation during training on the second mini-batch of images may be delayed if layer one 64, 76 is still synchronizing based upon the training by the first mini-batch of images.

In contrast, layer three 68, 80 has the most amount of time between backward and forward propagations. That is, during backward propagation of the first mini-batches, layer three 68, 80 are first out of the layers 64, 66, 68, 76, 78, 80 to process, and during forward propagation, layer three 68, 80 is last out of the layers to process. Therefore, a synchronization delay of layer three 68, 80 may be hidden behind the forward and backward propagation timings, whereas layer one 64, 76 and layer two 66, 78 closer to the pixel inputs 62, 74 have little if any time to hide such synchronization delays before processing the second mini-batches of images.

Since layer three 68, 80 is last during forward propagation, it may be beneficial to complete synchronization of layer three 68, 80 after the synchronization of layer one 64, 76, which is first during forward propagation, to avoid and/or minimize delays. For example, during forward propagation of the second mini-batches of images, layer three 68, 80 may still be synchronizing without delaying forward propagation of preceding layers 64, 76, 66, 78. This is because during forward propagation, layer three 68, 80 do not provide activation values to preceding layers 64, 76, 66, 78. As such, efficient scheduling of synchronization through synchronization barriers may enhance the training to minimize the amount of time for layers 64, 76, 66, 78, which are earlier in forward propagation, to synchronize with each other to reduce delays. Even if such minimization occurs at the expense of synchronization time of layer three 68, 80, such expense may be acceptable since layer three 68, 80 operates last during forward propagation and therefore has more time to hide the synchronization delay, and therefore a delay caused by synchronization at layer three 68, 80 may have the least impact out of delays at other layers 64, 66, 76, 78.

The scheduler 88 may schedule such synchronization barriers and synchronization timings. For example, the scheduler 88 may determine which layers 64, 76, 66, 78, 68, 80 have the longest blockage times, and adjust the synchronization schedule based upon the blockage times by implementing synchronization barriers.

Figure 4:
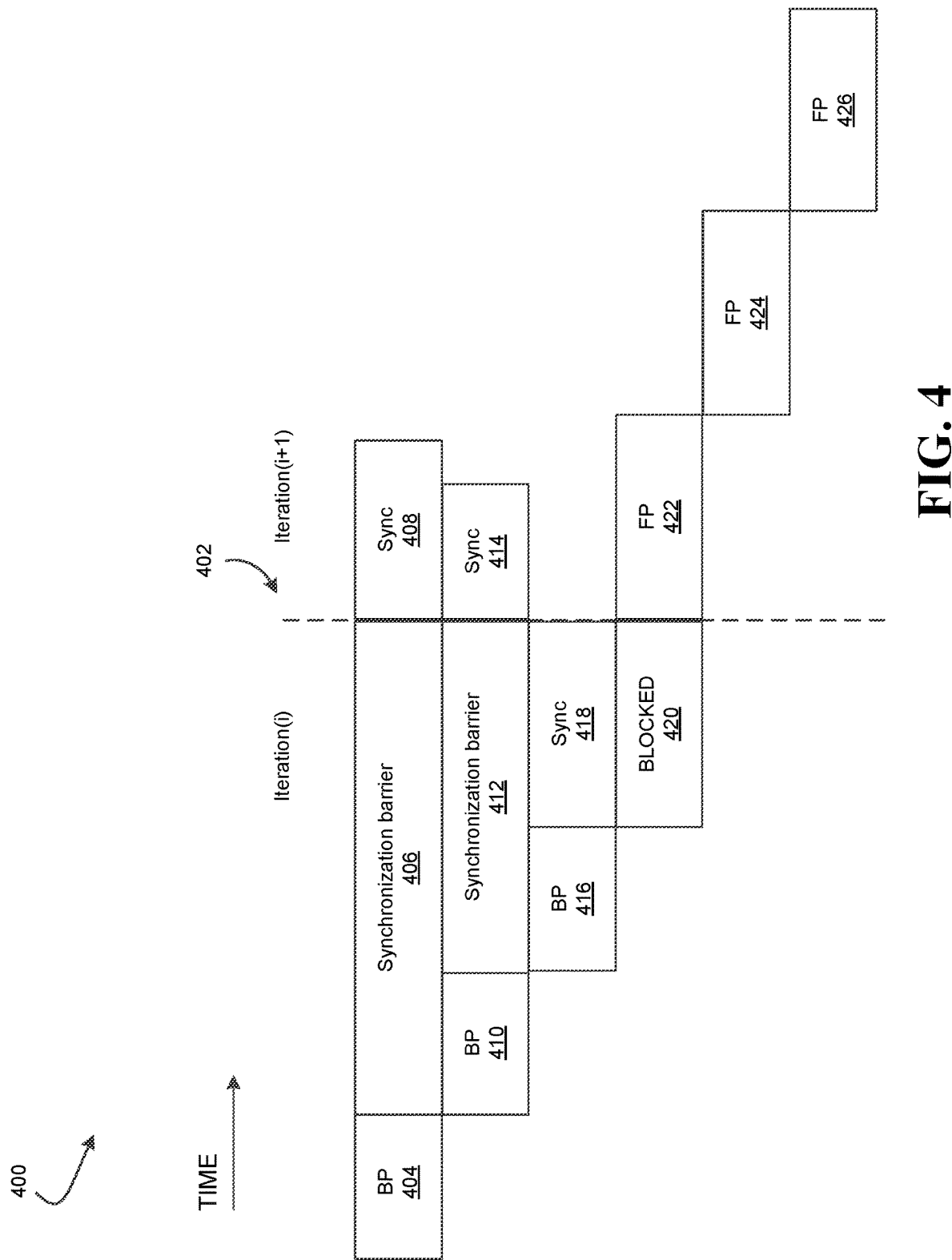
FIG. 4 is an illustration of a timing diagram of a DNN training process according to an embodiment.

FIG. 4 illustrates a timing diagram 400 of iteration(i) and iteration(i+1) of training of the nodes 72, 86 in accordance with some embodiments. An increase in time is in the direction along the arrow, towards the right. During iteration (i) the nodes 72, 86 are training on first training mini-batches. During iteration(i+1) the nodes 72, 86 are training on second training mini-batches. Time 402 demarcates the boundary between iteration(i) and iteration(i+1) of training. In this timing diagram, the scheduler 88 has already implemented synchronization barriers between layer one 64, 66 and layers two and three 66, 78, 68, 80 so that layers two and three 66, 78, 68, 80 do not synchronize until after layer one 64, 76 has completed synchronization.

Synchronization barriers may be implemented by the scheduler 88 to minimize delays and minimize blockage time. Synchronization barriers may stop, slow or impede synchronization by layers 68, 80, 66, 78, 64, 76 until other layers 68, 80, 66, 78, 64, 76 have completed synchronization. Thus, by implementing synchronization barriers, it may be possible to control the order in which layers 68, 80, 66, 78, 64, 76 obtain access to resources for synchronization. In other words, the initiation of synchronization operations for one layer may be dependent upon by the completion of one or more other synchronization operations of another layer. In the embodiment described below, a synchronization barrier is implemented between layer one 64, 76 and layer two 66, 78. Further, a synchronization barrier is implemented between layer one 64, 76 and layer three 68, 80.

During iteration(i), backward pass 404 of layer three 68, 80 completes first. Rather than immediately beginning synchronization 408, layer three 68, 80 stopped from synchronizing 406 by layer one 64, 76 and does not immediately synchronize due to the synchronization barrier. Backward pass 410 of layer two 66, 78 completes second. Rather than immediately beginning synchronization 414, layer two 66, 78 is stopped from synchronizing by layer one 64, 76 and does not immediately synchronize due to the synchronization barrier. The scheduler 88 may control the synchronization barriers. Backward pass 416 of layer one 64, 76 completes last, and layer one 64, 76 begins synchronization 418. Since the other layers 66, 78, 68, 80 are not synchronizing, layer one 64, 76 may have sufficient resources to efficiently complete synchronization 418. During synchronization 418, the nodes 72, 86 may be blocked 420 from processing the second mini batch. At time 402, the synchronization 418 completes, and the nodes 72, 86 are no longer blocked 420.

At time 402, the forward propagation 422 of the second mini-batch begins at layer one 64, 76. During forward propagation 422, layer two 66, 78 may synchronize 414, and the layer three 68, 80 may synchronize 408 as well. After forward propagation 422 has completed, forward propagation 424 occurs at layer two 66, 78. After forward propagation 424 has completed, forward propagation 426 occurs at layer three 68, 80.

The scheduler 88 implements the synchronization barriers as described above, which provides the enhancement in that layer one 64, 76 (which is a higher priority layer) may have access to resources for synchronization 418 before the other layers 66, 78, 68, 80 have access to resources for synchronizations 408, 414. For example, upon recognition that layer one 64, 76 is blocked and cannot process during forward propagation, an algorithm of scheduler 88 may adjust the synchronization barrier policy by adding synchronization barriers to a synchronization barrier set and so that the synchronization of the other layers 66, 78, 68, 80 is delayed or impeded until layer 64, 76 has completed synchronization. This may reduce contention while layers one 64, 76 is being synchronized. Furthermore, the scheduler 88 may delete synchronization barriers from the synchronization barrier set if the synchronization barriers are found to be detrimental to performance and efficiency. For example, if synchronization barriers are impeding layer one 64, 76 from synchronizing or increasing the total block time of the neural network, these synchronization barriers may be deleted.

Figure 5:
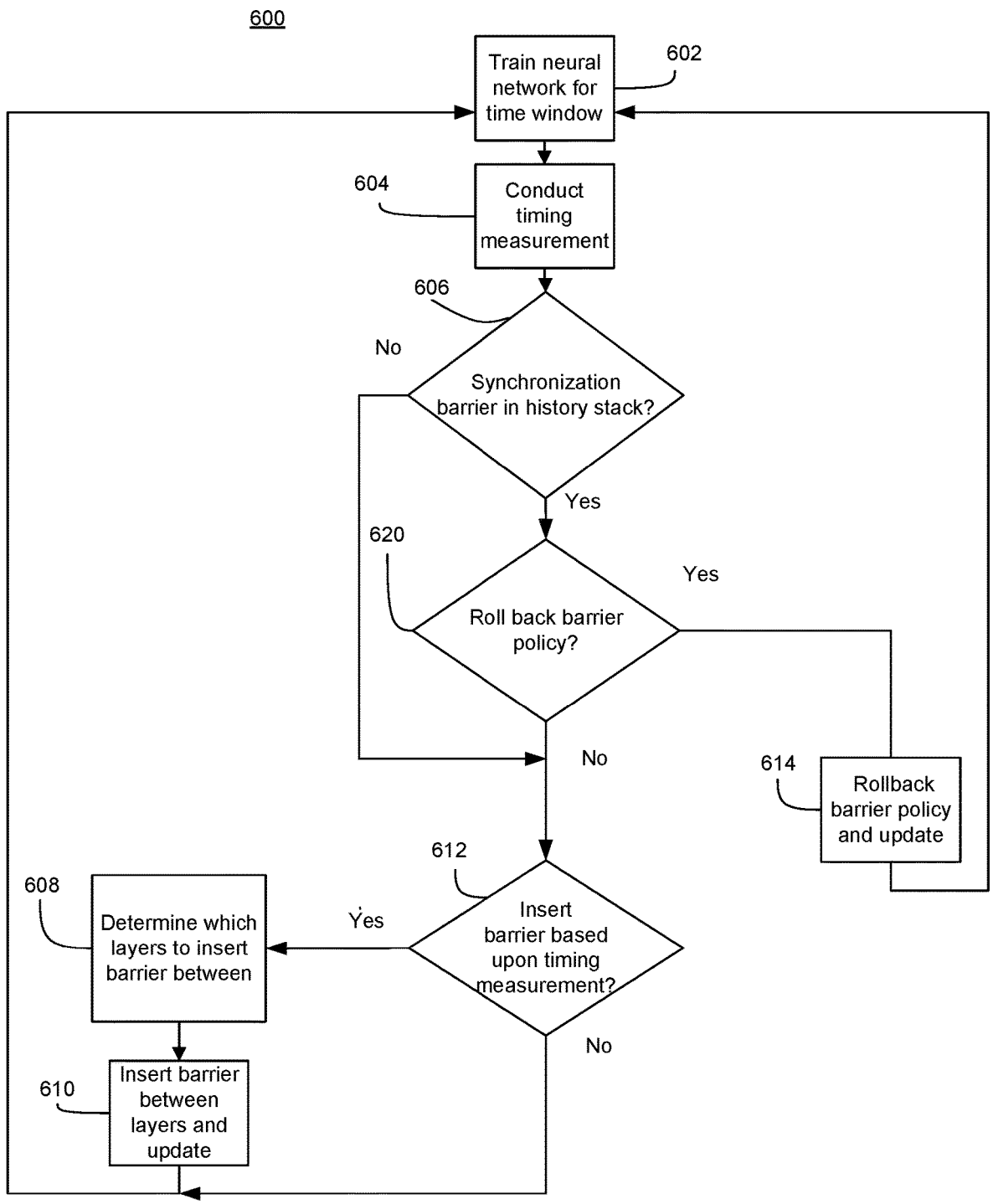
FIG. 5 is a flowchart of an example of a method of training a DNN according to an embodiment.

FIG. 5 shows a method 600 of training distributed DNNs, for example the nodes 72, 86, and may correspond to the scheduler 88. The method 600 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 602 trains the neural network as described above, for a specified window of time based upon the synchronous SGD process. The window of time may be one iteration of training (i.e., one mini-batch), two iterations of training (i.e., two mini-batches) and so on, where during each iteration mini-batches are provided to nodes of the neural network. The specified window may be set by a user in advance, and is a tunable value. During the training, a synchronization barrier policy may be implemented to implement synchronization barriers. For example, the synchronization barrier policy may be stored in a data structure including "synchronization barrier sets," which each includes data elements including a set of pairs. For example, the data structure may include elements each including the data (layer x, layer y), where layer x and layer y are layer indices. The synchronization barrier policy may include a last-in, first-out stack or an array including the data. In this example, it is assumed that layer y occurs after layer x during forward propagation, and that a synchronization barrier will be implemented so that layer y synchronizes after layer x. Thus, the synchronization barrier set may be referred to during training, and the synchronization barrier will be implemented between layer x and layer y.

The neural networks may include nodes which include several layers. The nodes may be trained for example, using the synchronous SGD process described above. As such, during forward propagation the nodes may create activation values to identify min-batches, during backward propagation the nodes may determine gradients of the parameters values, and then the nodes may be synchronized with each other so that the parameters synchronize through averaged gradients of the parameter values.

Illustrated processing block 604 may record the time each layer of the nodes is blocked (which may be referred to as blockage time) during forward propagation due to synchronization of that particular layer during the predetermined time window. For example, if layer one of the nodes is blocked from processing during forward propagation of an iteration because layer one is synchronizing from a previous iteration, illustrated processing block 604 may record the time that layer one is blocked, and associate that time with layer one. The time the layer is blocked may be referred to as "blockage time" or "block time." A data structure (e.g., an array such as a lookup table) may store the block time of each of the layers and the association of that block time with the blocked layer. Moreover, a total block time may be determined, which is a total amount of block time during the time window (i.e., over all of the iterations of the time window). That is, the total block time may be the sum of all of the block times of the layers (e.g., block time of layer 1+ . . . +block time of layer N) over all of the iterations of the time window.

Illustrated processing block 606 determines whether a synchronization barrier was added during a preceding time window with reference to a history stack, which may be a history data structure. If the current time window is the first time window, then no synchronization barrier was previously added. If a synchronization barrier was added in a previous time window, illustrated processing block 620 determines whether to modify the synchronization barrier policy.

This modification may include removing a synchronization barrier added during a preceding time window. For example, if the total block time in the preceding time window is less than the total block time in the current time window, it may be assumed that the previous synchronization barrier implementation detrimentally affected performance, and should therefore be removed.

In another example, the history stack (which may be a data structure such as an array or a last in, first out stack) may maintain a list of all implementations of synchronization barriers and timing measurements during the time windows associated with the implementations. Thus, the history stack may be may be used to maintain a history of the synchronization barrier implementations. For example, the stack may be a last in, first out stack, in which each element includes a (t, layer x, layer y) data element, where t is the total block time of the window which resulted in the synchronization barrier being implemented between layer x and layer y, and layer x and layer y are indices of the layers. As such, the stack may include elements, where each element includes a synchronization barrier implementation, and a total block timing measurement during a time window which resulted in the synchronization barrier being implemented. Illustrated processing block 620 may determine that if the total block timing of the timing measurement measured at block 604 is greater than the total block timing of a timing measurement of a most recent element of the history stack, the synchronization barrier of that most recent entry should be removed from the synchronization barrier policy. The most recent element may include the last synchronization barrier added, and also the timing measurement during the associated time window.

If it is determined that the synchronization barrier policy should be rolled back, illustrated processing block 614 rolls back the synchronization barrier policy. For example, the synchronization barrier may be removed from the synchronization barrier policy by removing the synchronization barrier from the synchronization barrier set. The history stack is further updated to remove the information pertaining to the removed synchronization barrier. The most recent element in the history stack and the synchronization barrier policy may now include a synchronization barrier implemented before the removed synchronization barrier was implemented.

If however illustrated processing block 606 determines that no synchronization barrier is included in the synchronization barrier policy or illustrated processing block 620 determines that the synchronization barrier policy should not be modified, then illustrated processing block 612 may determine whether a synchronization barrier should be implemented based upon the timing measurement. For example, if the block time of one of the layers is greater than a threshold value, then it may be determined that a synchronization barrier should be implemented to reduce the block time.

If so, illustrated processing block 608 may determine which layers to implement the synchronization barrier between. For example, illustrated processing block 608 may determine that a synchronization barrier should be implemented between a longest blocked layer, that has the longest block time, and a shorter blocked layer that has a shorter block time than that of the longest blocked layer so that the longest blocked layer synchronizes before the shorter blocked layer. The shorter block time may be the shortest block time from among all of the blocked times of the layers. If there are several layers that have block times which are shorter than the longest block time, a layer from the several layers which synchronizes closest in time to the longest blocked layer may be determined to be synchronized after the longest blocked layer. This may prevent overlapping usage of resources. Therefore, the longest blocked layer may synchronize before another layer (e.g., the layer which would otherwise synchronize closest in time to the longest blocked layer and has a shorter blocked time than the longest blocked layer). For example, if layer one has the longest block time, and both layers two and three have shorter blocked times, illustrated processing block 608 may determine that layer two should synchronize after layer one rather than layer three synchronizing after layer one. This is because layer two, out of layers two and three, would otherwise synchronize closer in time to layer one and therefore has the highest probability of having an overlapping synchronization with layer one. Thus, a synchronization barrier may be implemented so that layer two synchronizes after layer one.

In some embodiments, illustrated processing block 608 may determine that the synchronization barrier should be implemented between a last layer, which processes last in time during forward propagation, and the longest blocked layer so that the longest blocked layer synchronizes after the last layer. For example, if there are several layers that have blocked times which are shorter than the longest blocked time, a layer from the several layers which processes last in time during forward propagation may be determined to be synchronized after the longest blocked layer. This may prevent forward propagation from being delayed because of synchronization since the lower priority layers are first delayed for synchronization. So for example, if layer one is the longest blocked layer, and both layers two and three have shorter blocked times, then layer three may be determined to be synchronized after layer one because layer three processes after layer two during forward propagation. A synchronization barrier may be implemented so that layer three synchronizes after layer one.

The method 600 may then proceed to illustrated processing block 610. Illustrated processing block 610 may implement a synchronization barrier between the layers determined by illustrated processing block 608. The synchronization barrier may slow or impede synchronization of the shorter blocked layer until the longer blocked layer has completed synchronization. The synchronization barrier may be stored as part of the synchronization barrier policy as a "synchronization barrier set" described above. Thus, the added synchronization barrier set may be referred to during future timing windows, and the synchronization barrier will be implemented. Furthermore, the history stack may be updated to record the implementation, and may be used to maintain history data of the synchronization barrier implementations. When a new synchronization barrier is added to the synchronization barrier set, the history stack may track the source and target layers, as well as the block time observed for the window when the synchronization barrier was added. This may be stored for example as (t, layer x, layer y) in a last-in, first-out stack, where t is the total block time during the window which resulted in the synchronization barrier between layer x and layer y being added, and layer x and layer y are indices. Various data structures (e.g., array) may be used to store the above history data.

If at illustrated processing block 612, it is determined that no synchronization barrier should be implemented, then the method 600 proceeds to illustrated processing block 602, in which training of the neural network continues using new mini-batches. The method 600 may then return to illustrated processing block 604.

The above method 600 and the scheduler 88 may operate according to the following algorithm:

```
history      : stack of (int * int * int) := emtpy stack
time         : array[num_layers] of int := [0,0,...,0]
barrier_set  : set of (int * int) := empty set
iter_count   : int := 0
window_size  : const int := <<tunable parameter of the algorithm>>
while training is not done:
   for L from 1 to num_layers:
      start_time <- now
      wait for synchronization of L to finish
      time[L] <- time [L] + (now - start_time)
      do forward prop for L
   for L from num_layers downto 1:
      do backward prop for L
      signal that L is ready for synchronization
   iter_count <- iter_count + 1
   if iter_count mod window_size = 0:
      curr_time <- sum(time)
      if history is empty or top(history) is of form (last_time,_,_) such that last_time > curr_time:
         L_barrier <- argmax(time) // find layer that has spent the most time blocked
```

```
    L_target <- smallest L > L_barrier such that (L_barrier,L) is not in barrier_set
    add_to_set(barrier_set,(L_barrier,L_target))
    push (history,(curr_time,L_barrier,L_target))
  else:
    (_,L_barrier,L_target) <- pop(history)
    delete_from_set(barrier_set,(L_barrier,L_target))
  time := [0,0,...,0]
```

This algorithm may be implemented by computer code, and/or hardware implemented by at least one of configurable logic or fixed-functionality logic hardware. While the above method 600 is implemented in a multi-node system, it may also be possible to adjust the above method to a single-node system in which a shared memory is used to store and update the gradients of the parameters values of layers. Thus, higher priority layers may be scheduled to synchronize to update through the shared memory before other layers having lower priority.

FIG. 6 illustrates a table illustrating an implementation of a synchronization barrier policy by a scheduler. In the present example, a neural network includes layers L1, L2, L3, L4 arranged in that order from an input. That is, layer L1 receives the input (e.g., a mini-batch of images), L2 receives activation values from L1, L3 receives activation values from L2, and L4 receives activation values from L3. As such, layer L1 is the highest priority layer (i.e., the layer which should synchronize first during a first training iteration, to begin forward propagation during a second training iteration), and layer L4 has the least priority. Each window may include the synchronization of an iteration (e.g., i) and the forward propagation of the next iteration (e.g., (i+1)), and may include several iterations.

During window 0, the scheduler determines that layer L1 is the most blocked layer at 15 ms. The scheduler therefore implements a synchronization barrier between layer L1 and layer L2. The synchronization barrier is represented as (1, 2) in the synchronization barrier policy column, where 1 represent layer L1, and 2 represents layer L2. The synchronization barrier policy column may be stored as a data structure, such as a last in, first out queue. Thus, layer L2 has slowed or impeded synchronization or cannot synchronize until L1 has completed synchronization. Layer L2 may be determined to be synchronized before layers L3 and L4 because layer L2 synchronizes closest in time to layer L1, and therefore is the most likely layer out of layers L2, L3, L4 to have a longest overlapping synchronization period with layer L1. Therefore, it is more probable that layers L1 and L2 compete for resources during synchronization than layers L1, L3, L4. Thus, adding the synchronization barrier between layers L1 and L2 is more likely to have an impact on resources during synchronization of L1 than adding synchronization barriers between L1 and other layers L3, L4.

During window 1, the scheduler determines that layer L1 remains the most blocked layer at 8 ms. Thus, the total blockage time for layer one L1 has decreased and the total block time has decreased. Nonetheless, it may still be possible to enhance the neural network by adding another synchronization barrier to reduce the total block time. The scheduler responds by adding a synchronization barrier between layer L1 and layer L3, which is synchronization barrier set (1, 3). Thus, layer L3 has impeded synchronization or cannot synchronize until L1 has completed synchronization.

During window 2, the synchronizer determines that layer L2 is now the most blocked layer. Therefore, the scheduler adds a synchronization barrier between layer L2 and layer L3, which is synchronization barrier set (2, 3).

During window 3, the scheduler determines that the total block time has increased from 11 ms in window 2, to 12.5 ms in window 3. Therefore, the scheduler removes synchronization barrier set (2, 3) as the implementation of the synchronization barrier set (2, 3) increased the total blocked time in a sub-optimal decision.

As illustrated, during windows 4-9, the scheduler may oscillate between adding a synchronization barrier (2, 3) between layer L2 and layer L3, and removing the synchronization barrier (2, 3). In some embodiments, after the scheduler determines that a suboptimal decision, such as adding the synchronization barrier (2, 3) between layers L2 and L3, is occurring with consistency, the scheduler may blacklist this decision and avoid implementation thereof until an event triggers this decision as being whitelisted. For example, the ideal synchronization barrier sets may include (1, 2) and (1, 3), and the total block time is 11 ms. Therefore, after two cycles of adding synchronization barrier (2,3) (i.e., windows 3 and 5) which results in higher block times (12.5 ms), the scheduler may determine that adding synchronization barrier (2, 3) is a sub-optimal decision and ignores this decision. The scheduler may further determine that addition of further synchronization barriers may be sub-optimal, and therefore avoids adding more synchronization barriers, and continues processing min-batches according to synchronization barriers (1, 2) and (1, 3). If however the total block time changes beyond a specific tolerance range (e.g., 1 ms), the scheduler may determine that an event is causing a change in the total block time, and therefore begin scheduling of new synchronization barriers and/or removal of the synchronization barriers.

For example, if an event occurs (e.g., a user initiates a resource intensive program), the total block times may change. After such an event, the synchronization policy may need to be adjusted with reference to the historical stack. For example, a total block time during each window of the training after the event may be compared to a previous window of a training gate set (e.g., before the event). The synchronization policy may be adjusted or rolled back to remove synchronization barriers.

For example, in each of a first three windows (not illustrated), a synchronization barrier may be implemented, and maintained in a history stack discussed above. If an event occurs after window three, and during window seven of training so that the total block time increases relative to window three, the synchronization barrier first implemented based upon window three may be removed from the synchronization barrier policy and the history stack. If during window eight of the training the total block time is greater than that of window two, which is the next window in the history stack, the synchronization barrier first implemented based upon window two may be removed from the synchronization barrier policy and the history stack. If during window nine of the training the total block time is greater than window one, which is the next window in the stack, the synchronization barrier first implemented based upon window one may be removed from the synchronization barrier policy and the history stack. Therefore, the synchronization barrier policy may be rolled back completely based upon the history stack.

Figure 7:
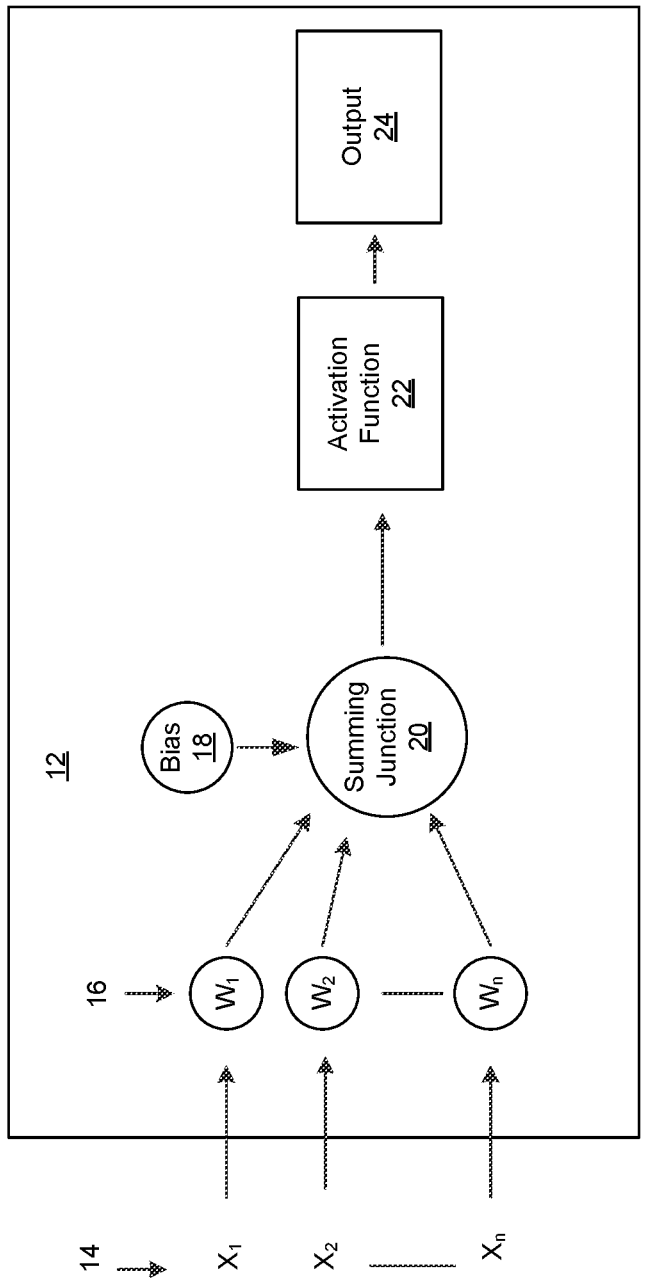
FIG. 7 is an illustration of an example of a neural network node according to an embodiment.

FIG. 7 illustrates a structure of a neural network node 12. Any node could include a structure as that illustrated by FIG. 7. An input signal 14 is provide to the neural network node 12. The input signal 14 may be divided into $X_1$-$X_k$ signals, which are transmitted to the neural network node 12. The weight elements 16, which may correspond to neurons, may receive the $X_1$-$X_k$ signals and multiply weights $W_1$-$W_n$ by the $X_1$-$X_k$ signals. The outputs from 16 and a bias $B_1$-$B_j$ may also be provided to the summing junction 20. The activation function 22 may receive an output from the summing junction 20, transform the output, and provide the transformed output to the output 24. The activation function 22 may be a non-linear activation function line tan h or rectified linear unit, defined as relu(x)=0 if x<0, else x. The output 24 may be the output value of the neural network node 12

Figure 8:
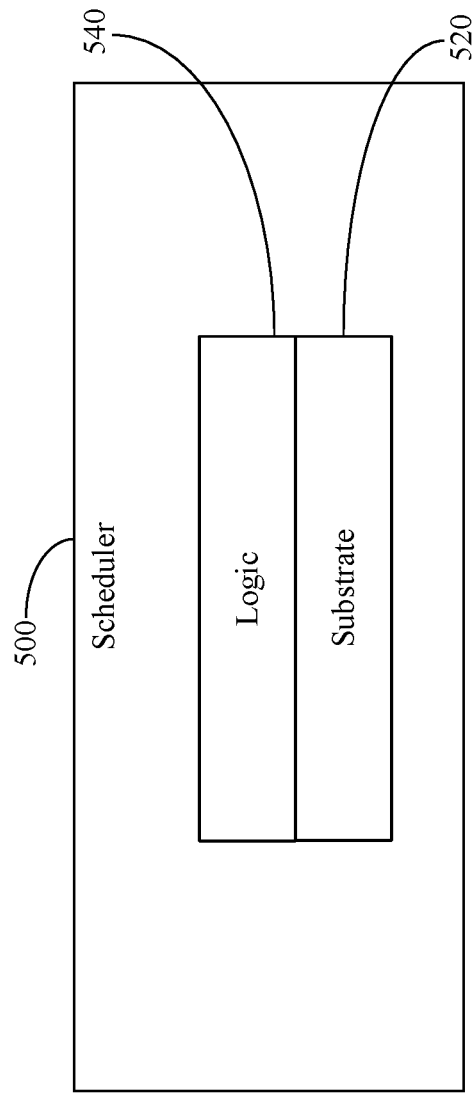
FIG. 8 is an illustration of an example of a scheduler according to an embodiment.

FIG. 8 illustrates a scheduler 500. The scheduler 500 may be implemented in one or more aspects of the methods 300 and 600 (FIGS. 2 and 5) and may be readily substituted for the scheduler (FIG. 6), and as part of the scheduler 88 (FIG. 3), already discussed. The illustrated scheduler 500 includes a substrate 520 (e.g., silicon, sapphire, gallium arsenide) and logic 540 (e.g., transistor array and other integrated circuit/IC components) coupled to the substrate 520. The logic 540 may be implemented at least partly in configurable logic or fixed-functionality logic hardware. Moreover, the logic 540 may schedule a synchronization of various layers of a neural network based upon a priority of the layers.

Figure 9:
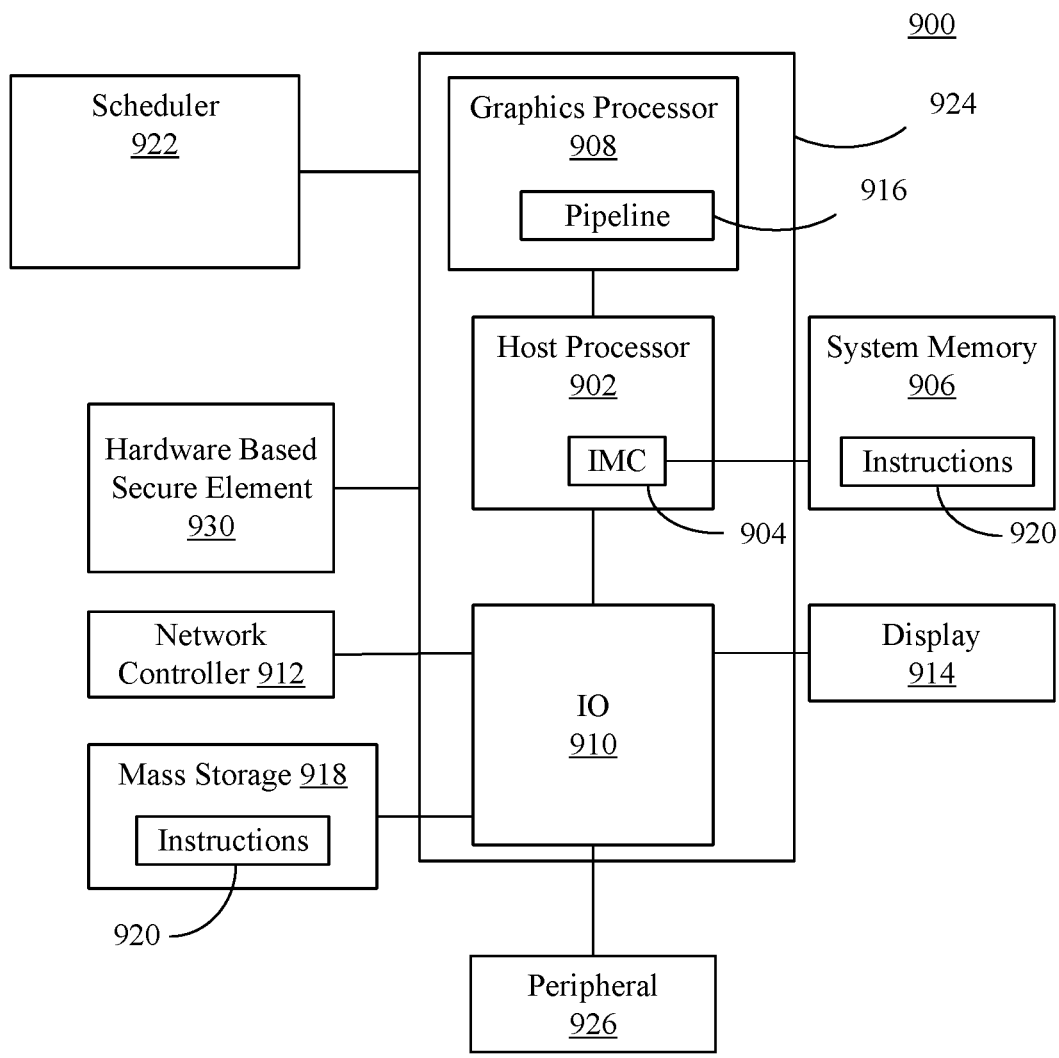
FIG. 9 illustrates an example of an enhanced neural network training compute node according to an embodiment.

FIG. 9 illustrates an enhanced neural network computing system 900. The illustrated system 900 includes a system on chip (SoC) 924 having a host processor (e.g., central processing unit/CPU) 902, a graphics processor 908 and an input/output (IO) module 910. In the illustrated example, the host processor 902 includes an integrated memory controller (IMC) 904 that communicates with a system memory 906 (e.g., DRAM).

The host processor 902 may be coupled to the graphics processor 908, which may include a graphics pipeline 916, and the IO module 910. The IO module 910 may be coupled to a network controller 912 (e.g., wireless and/or wired), a display 914 (e.g., fixed or head mounted liquid crystal display/LCD, light emitting diode/LED display, etc., to visually present a video of a 3D scene) and mass storage 918 (e.g., flash memory, optical disk, solid state drive/SSD).

The illustrated system 900 includes a scheduler 922, which may operate and include features as described herein, for example similarly to the scheduler 88 described in FIG. 3. The scheduler 922 may be connected to the SoC 924. The scheduler 922 may be connected to nodes which may be operating as described above and control scheduling of synchronization of the nodes. The SoC 924 may implement at least one of the nodes, and the scheduler 922 may be connected to other nodes through the network controller 912. Furthermore, the scheduler 922 may control scheduling of only one node.

In some embodiments, the scheduler 922 may be part of the SoC 924. In some embodiments, the system memory 906 and/or the mass storage 918 may include instructions 920, which when executed by the host processor 902 and/or the graphics processor 908, cause the system 900 to perform one or more aspects of the methods 300 and 600 (FIGS. 2 and 5) and the scheduler 88. In some embodiments, parts of the scheduler 922 are implemented by the SoC 924, while other parts of the scheduler 922 are implemented by the system memory 906.

Figure 10:
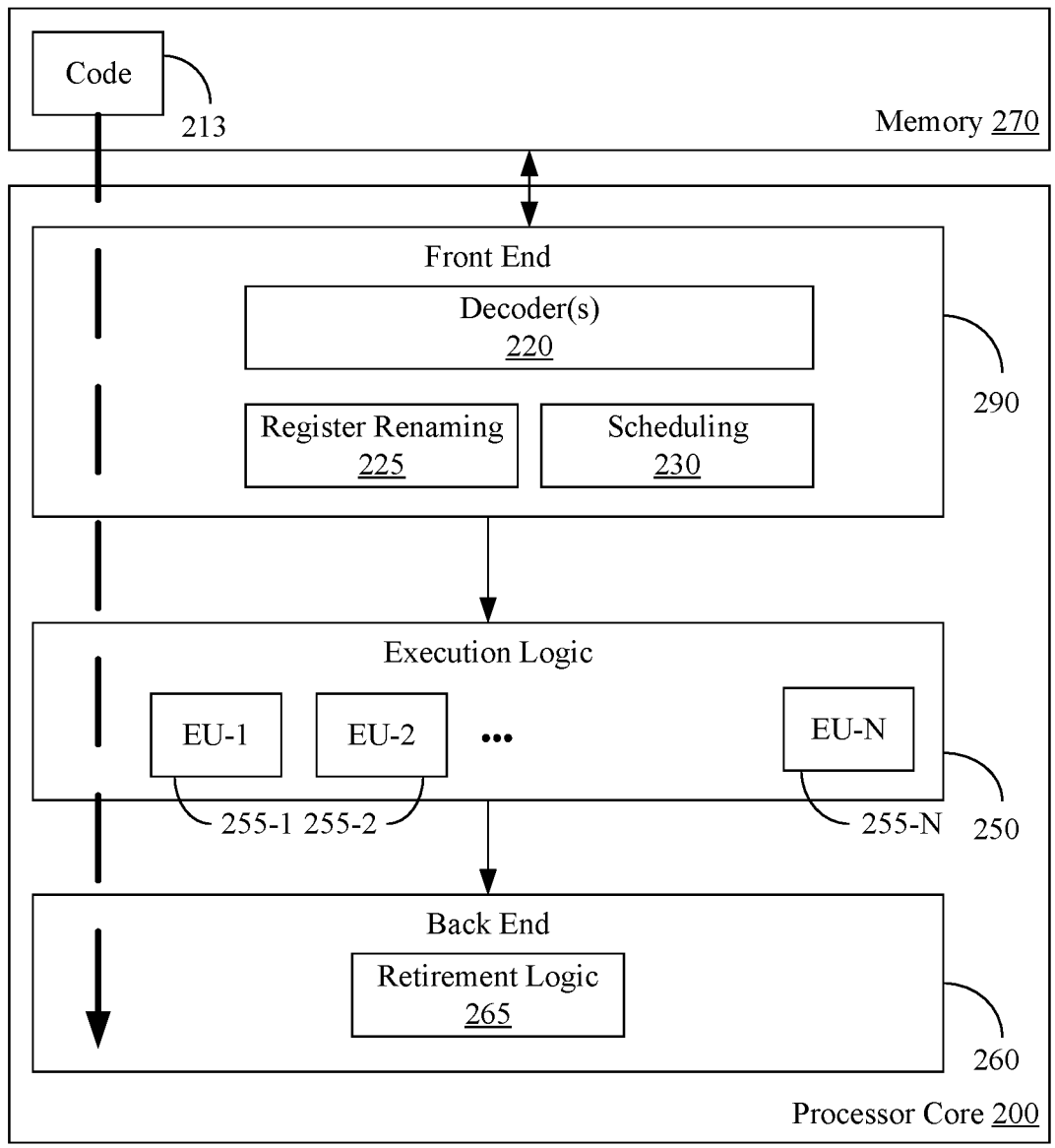
FIG. 10 illustrates an example of a processor core according to an embodiment.

FIG. 10 illustrates a processor core 200 according to an embodiment. The processor core 200 may be the core for any type of processor, such as a micro-processor, an embedded processor, a digital signal processor (DSP), a network processor, or other device to execute code. Although only one processor core 200 is illustrated in FIG. 10, a processing element may alternatively include more than one of the processor core 200 illustrated in FIG. 10. The processor core 200 may be a single-threaded core or, for at least one embodiment, the processor core 200 may be multithreaded in that it may include more than one hardware thread context (or "logical processor") per core.

FIG. 10 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the scheduler 88, illustrated in for example FIG. 3, and/or the methods 300 and 600 of FIGS. 2 and 5, already discussed. For example, the code 213 may execute the logic of the scheduler 88, illustrated in for example FIG. 3, and/or the methods 300 and 600 of FIGS. 2 and 5. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 10, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 11:
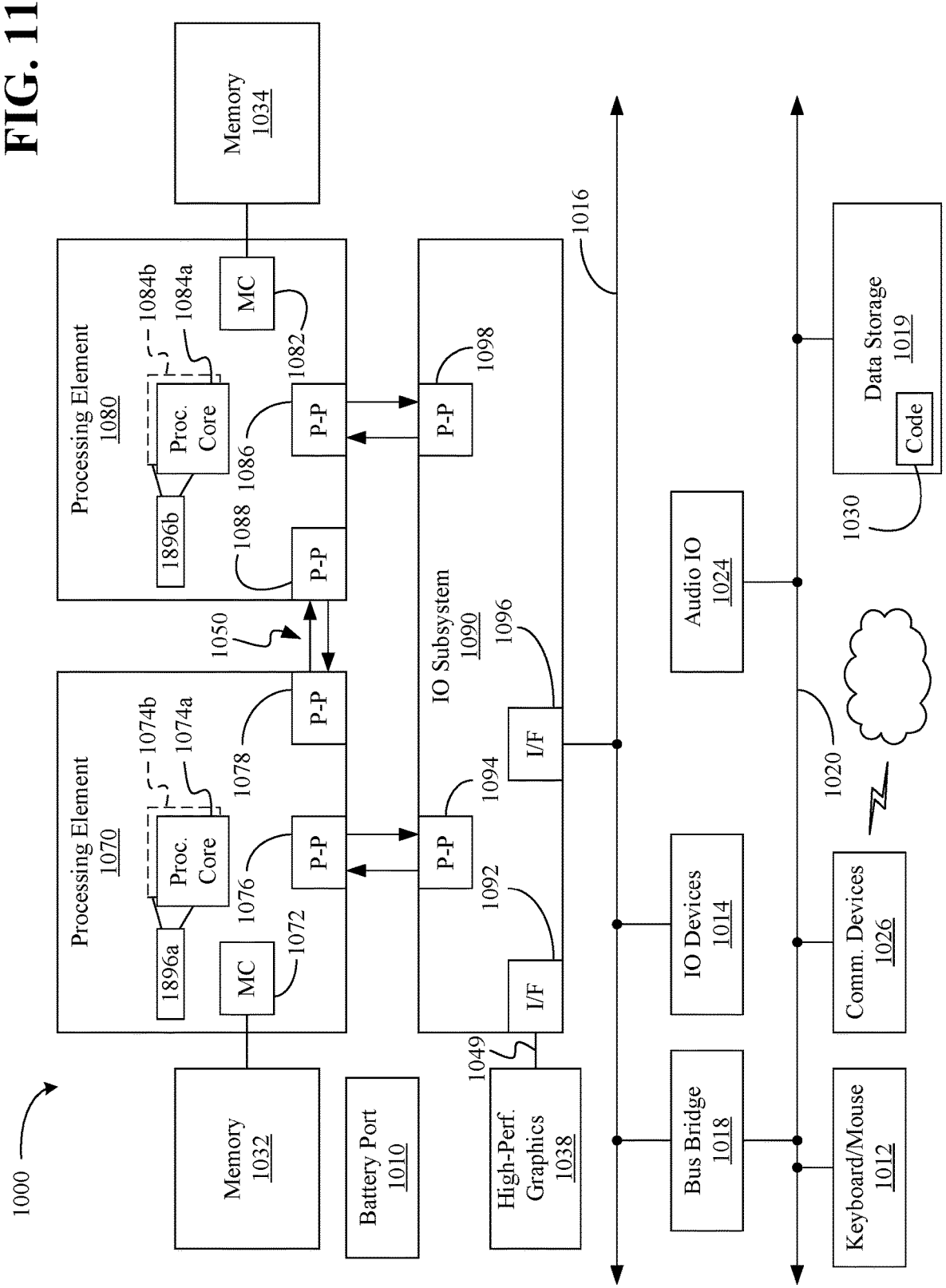
FIG. 11 illustrates a block diagram of a computing system according to an embodiment.

Referring now to FIG. 11, shown is a block diagram of a computing system 1000 embodiment in accordance with an embodiment. Shown in FIG. 11 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 11 may be implemented as a multi-drop bus rather than point-to-point interconnect.

As shown in FIG. 11, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 10.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more processing elements 1070, 1080 may be an element other than a processor, such as an accelerator or a field programmable synchronization barrier array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable synchronization barrier arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 11, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 11, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 11 various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030, which may be similar to the code 213 (FIG. 9), may implement one or more aspects of the scheduler 88 (FIG. 3) and/or the method 300 (FIG. 2), and/or the method 600 (FIG. 5), already discussed. The scheduler 88 and/or the method 300 (FIG. 2), and/or the method 600 (FIG. 5), may further be implemented by one or more the processing elements 1070 and 1080. Further, an audio I/O 1024 may be coupled to second bus 1020 and a battery port 1010 may supply power to the computing system 1000.

Additional Notes and Examples

Example 1 may include a neural network training system, comprising a chip implementing at least one node in a cluster of systems training the neural network, and a scheduler to conduct a first timing measurement of a blockage timing of a first window of the training of the neural network, the blockage timing to measure a time that processing is impeded at layers of the neural network during the first window of the training due to synchronization of one or more synchronizing parameters of the layers, based upon the first timing measurement, determine whether to modify a synchronization barrier policy to include a synchronization barrier to impede synchronization of one or more synchronizing parameters of one of the layers during a second window of the training, and impede the synchronization of the one or more synchronizing parameters of the one of the layers during the second window if the synchronization barrier policy is modified to include the synchronization barrier.

Example 2 may include the system of example 1, wherein the one or more synchronizing parameters of the layers include one or more of weights or biases of the layers, and the scheduler is to conduct the first timing measurement to determine a respective blockage timing of each of the layers of the neural network during forward propagation of the first window.

Example 3 may include the system of example 2, wherein the scheduler is to determine that the synchronization barrier policy is to be modified to include the synchronization barrier, and the scheduler is to modify the synchronization barrier policy to add the synchronization barrier to be between another of the layers, that has a longest blockage timing from among the respective blockage timings, and the one of the layers, and during the second window of the training and based upon the synchronization barrier policy, prevent synchronization of the one or more synchronizing parameters of the one of the layers until the another of the layers has completed synchronization of one or more synchronizing parameters of the another of the layers.

Example 4 may include the system of example 3, wherein the scheduler is to conduct a second timing measurement of another blockage timing during the second window of the training of the neural network, the another blockage timing to measure a time that processing is impeded at the layers of the neural network during the second window of the training due to synchronization of one or more synchronizing parameters of the layers, determine whether a second total blockage timing of the second timing measurement is greater than a first total blockage timing of the first timing measurement, and remove the synchronization barrier from the synchronization barrier policy when the second total blockage timing is determined to be greater than the first total blockage timing.

Example 5 may include the system of any one of examples 1-2, wherein the scheduler is to determine that a synchronization barrier is to be implemented between first and second layers of the layers, modify the synchronization barrier policy to add the synchronization barrier between the first and second layers, and during another window of the training, stop synchronization of one or more synchronizing parameters of the second layer until synchronization of one or more synchronizing parameters of the first layer is completed.

Example 6 may include the system of example 1, wherein the scheduler is to maintain a history data structure including a plurality of elements, each element of the history data structure including a respective total blockage timing during a respective window of the training and a synchronization barrier added based upon the respective window, and remove synchronization barriers of the synchronization barriers from the synchronization barrier policy based upon a comparison of total blockage timings during windows of the training to the respective total blockage timings maintained in the history data structure.

Example 7 may include a scheduling apparatus for a neural network, comprising a substrate, and logic coupled to the substrate and implemented at least partly in one or more of configurable logic or fixed-functionality logic hardware, the logic to conduct a first timing measurement of a blockage timing of a first window of training of the neural network, the blockage timing to measure a time that processing is impeded at layers of the neural network during the first window of the training due to synchronization of one or more synchronizing parameters of the layers, based upon the first timing measurement, determine whether to modify a synchronization barrier policy to include a synchronization barrier to impede synchronization of one or more synchronizing parameters of one of the layers during a second window of the training, and impede the synchronization of the one or more synchronizing parameters of the one of the layers during the second window if the synchronization barrier policy is modified to include the synchronization barrier.

Example 8 may include the apparatus of example 7, wherein the one or more synchronizing parameters of the layers include one or more of weights or biases of the layers, and the logic is to conduct the first timing measurement to determine a respective blockage timing of each of the layers of the neural network during forward propagation of the first window.

Example 9 may include the apparatus of example 8, wherein the logic is to determine that the synchronization barrier policy is to be modified to include the synchronization barrier, and the logic is to modify the synchronization barrier policy to add the synchronization barrier to be between another of the layers, that has a longest blockage timing from among the respective blockage timings, and the one of the layers, and during the second window of the training and based upon the synchronization barrier policy, prevent synchronization of the one or more synchronizing parameters of the one of the layers until the another of the layers has completed synchronization of one or more synchronizing parameters of the another of the layers.

Example 10 may include the apparatus of example 9, wherein the logic is to conduct a second timing measurement of another blockage timing during the second window of the training of the neural network, the another blockage timing to measure a time that processing is impeded at the layers of the neural network during the second window of the training due to synchronization of one or more synchronizing parameters of the layers, determine whether a second total blockage timing of the second timing measurement is greater than a first total blockage timing of the first timing measurement, and remove the synchronization barrier from the synchronization barrier policy when the second total blockage timing is determined to be greater than the first total blockage timing.

Example 11 may include the apparatus of any one of examples 7-8, wherein the logic is to determine that a synchronization barrier is to be implemented between first and second layers of the layers, modify the synchronization barrier policy to add the synchronization barrier between the first and second layers, and during another window of the training, stop synchronization of one or more synchronizing parameters of the second layer until synchronization of one or more synchronizing parameters of the first layer is completed.

Example 12 may include the apparatus of example 7, wherein the logic is to maintain a history data structure including a plurality of elements, each element of the history data structure including a respective total blockage timing during a respective window of the training and a synchronization barrier added based upon the respective window, and remove synchronization barriers of the synchronization barriers from the synchronization barrier policy based upon a comparison of total blockage timings during windows of the training to the respective total blockage timings maintained in the history data structure.

Example 13 may include a method of training a neural network, comprising conducting a first timing measurement of a blockage timing of a first window of the training of the neural network, the blockage timing to measure a time that processing is impeded at layers of the neural network during the first window of the training due to synchronization of one or more synchronizing parameters of the layers, based upon the first timing measurement, determining whether to modify a synchronization barrier policy to include a synchronization barrier to impede synchronization of one or more synchronizing parameters of one of the layers during a second window of the training, and impeding the synchronization of the one or more synchronizing parameters of the one of the layers during the second window if the synchronization barrier policy is modified to include the synchronization barrier.

Example 14 may include the method of example 13, wherein the one or more synchronizing parameters of the layers include one or more of weights or biases of the layers, and the conducting includes measuring a respective blockage timing of each of the layers of the neural network during forward propagation of the first window.

Example 15 may include the method of example 14, wherein the determining includes determining that the synchronization barrier policy is to be modified to include the synchronization barrier, the method further including modifying the synchronization barrier policy to add the synchronization barrier to be between another of the layers, that has a longest blockage timing from among the respective blockage timings, and the one of the layers, and during the second window of the training and based upon the synchronization barrier policy, preventing synchronization of the one or more synchronizing parameters of the one of the layers until the another of the layers has completed synchronization of one or more synchronizing parameters of the another of the layers.

Example 16 may include the method of example 15, further comprising conducting a second timing measurement of another blockage timing during the second window of the training of the neural network, the another blockage timing to measure a time that processing is impeded at the layers of the neural network during the second window of the training due to synchronization of one or more synchronizing parameters of the layers, determining whether a second total blockage timing of the second timing measurement is greater than a first total blockage timing of the first timing measurement, and removing the synchronization barrier from the synchronization barrier policy when the second total blockage timing is determined to be greater than the first total blockage timing.

Example 17 may include the method of any one of examples 13-14, further comprising determining that a synchronization barrier is to be implemented between first and second layers of the layers, modifying the synchronization barrier policy to add the synchronization barrier between the first and second layers, and during another window of the training, stopping synchronization of one or more synchronizing parameters of the second layer until synchronization of one or more synchronizing parameters of the first layer is completed.

Example 18 may include the method of example 13, further comprising maintaining a history data structure including a plurality of elements, each element of the history data structure including a respective total blockage timing during a respective window of the training and a synchronization barrier added based upon the respective window, and removing synchronization barriers of the synchronization barriers from the synchronization barrier policy based upon a comparison of total blockage timings during windows of the training to the respective total blockage timings maintained in the history data structure.

Example 19 may include at least one computer readable storage medium comprising a set of instructions, which when executed, cause a computing system to conduct a first timing measurement of a blockage timing of a first window of training of a neural network, the blockage timing to measure a time that processing is impeded at layers of the neural network during the first window of the training due to synchronization of one or more synchronizing parameters of the layers, based upon the first timing measurement, determine whether to modify a synchronization barrier policy to include a synchronization barrier to impede synchronization of one or more synchronizing parameters of one of the layers during a second window of the training, and impede the synchronization of the one or more synchronizing parameters of the one of the layers during the second window if the synchronization barrier policy is modified to include the synchronization barrier.

Example 20 may include the at least one computer readable storage medium of example 19, wherein the one or more synchronizing parameters of the layers include one or more of weights or biases of the layers, and the instructions, when executed, cause the computing system to conduct the first timing measurement to determine a respective blockage timing of each of the layers of the neural network during forward propagation of the first window.

Example 21 may include the at least one computer readable storage medium of example 20, wherein the synchronization barrier policy is to be modified to include the synchronization barrier, and wherein the instructions, when executed, cause the computing system to modify the synchronization barrier policy to add the synchronization barrier to be between another of the layers, that has a longest blockage timing from among the respective blockage timings, and the one of the layers, and during the second window of the training and based upon the synchronization barrier policy, prevent synchronization of the one or more synchronizing parameters of the one of the layers until the another of the layers has completed synchronization of one or more synchronizing parameters of the another of the layers.

Example 22 may include the at least one computer readable storage medium of example 21, wherein the instructions, when executed, cause the computing system to conduct a second timing measurement of another blockage timing during the second window of the training of the neural network, the another blockage timing to measure a time that processing is impeded at the layers of the neural network during the second window of the training due to synchronization of one or more synchronizing parameters of the layers, determine whether a second total blockage timing of the second timing measurement is greater than a first total blockage timing of the first timing measurement, and remove the synchronization barrier from the synchronization barrier policy when the second total blockage timing is determined to be greater than the first total blockage timing.

Example 23 may include the at least one computer readable storage medium of any one of examples 19-20, wherein the instructions, when executed, cause the computing system to determine that a synchronization barrier is to be implemented between first and second layers of the layers, modify the synchronization barrier policy to add the synchronization barrier between the first and second layers, and during another window of the training, stop synchronization of one or more synchronizing parameters of the second layer until synchronization of one or more synchronizing parameters of the first layer is completed.

Example 24 may include the at least one computer readable storage medium of example 19, wherein the instructions, when executed, cause the computing system to maintain a history data structure including a plurality of elements, each element of the history data structure including a respective total blockage timing during a respective window of the training and a synchronization barrier added based upon the respective window, and remove synchronization barriers of the synchronization barriers from the synchronization barrier policy based upon a comparison of total blockage timings during windows of the training to the respective total blockage timings maintained in the history data structure.

Example 25 may include the at least one computer readable storage medium of example 19, wherein the instructions, when executed, cause the computing system to implement the synchronization barrier to stop synchronization of gradients of the one or more synchronizing parameters of the one of the layers until synchronization of gradients of one or more synchronizing parameters of another of the layers is complete during the second window.

Example 26 may include a scheduling apparatus for a neural network, comprising means for conducting a first timing measurement of a blockage timing of a first window of training of the neural network, the blockage timing to measure a time that processing is impeded at layers of the neural network during the first window of the training due to synchronization of one or more synchronizing parameters of the layers, means for based upon the first timing measurement, determining whether to modify a synchronization barrier policy to include a synchronization barrier to impede synchronization of one or more synchronizing parameters of one of the layers during a second window of the training, and means for impeding the synchronization of the one or more synchronizing parameters of the one of the layers during the second window if the synchronization barrier policy is modified to include the synchronization barrier.

Example 27 may include the apparatus of example 26, wherein the one or more synchronizing parameters of the layers include one or more of weights or biases of the layers, and the means for conducting includes a means for determining a respective blockage timing of each of the layers of the neural network during forward propagation of the first window.

Example 28 may include the apparatus of example 27, wherein the means for determining determines that the synchronization barrier policy is to be modified to include the synchronization barrier, the apparatus further including means for modifying the synchronization barrier policy to add the synchronization barrier to be between another of the layers, that has a longest blockage timing from among the respective blockage timings, and the one of the layers, and means for during the second window of the training and based upon the synchronization barrier policy, preventing synchronization of the one or more synchronizing parameters of the one of the layers until the another of the layers has completed synchronization of one or more synchronizing parameters of the another of the layers.

Example 29 may include the apparatus of example 28, further comprising means for conducting a second timing measurement of another blockage timing during the second window of the training of the neural network, the another blockage timing to measure a time that processing is impeded at the layers of the neural network during the second window of the training due to synchronization of one or more synchronizing parameters of the layers, means for determining whether a second total blockage timing of the second timing measurement is greater than a first total blockage timing of the first timing measurement, and means for removing the synchronization barrier from the synchronization barrier policy when the second total blockage timing is determined to be greater than the first total blockage timing.

Example 30 may include the apparatus of any one of examples 26-27, further comprising means for determining that a synchronization barrier is to be implemented between first and second layers of the layers, means for modifying the synchronization barrier policy to add the synchronization barrier between the first and second layers, and means for during another window of the training, stopping synchronization of one or more synchronizing parameters of the second layer until synchronization of one or more synchronizing parameters of the first layer is completed.

Example 31 may include the apparatus of example 26, further comprising means for maintaining a history data structure including a plurality of elements, each element of the history data structure including a respective total blockage timing during a respective window of the training and a synchronization barrier added based upon the respective window, and means for removing synchronization barriers of the synchronization barriers from the synchronization barrier policy based upon a comparison of total blockage timings during windows of the training to the respective total blockage timings maintained in the history data structure.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A neural network training system, comprising:
   a chip implementing at least one node in a cluster of systems training the neural network; and
   a scheduler to:
   conduct a first timing measurement of a blockage timing of a first window of the training of the neural network, the blockage timing to measure a time that processing is impeded at layers of the neural network during the first window of the training due to synchronization of one or more synchronizing parameters of the layers;
   based upon the first timing measurement, determine whether to modify a synchronization barrier policy to include a synchronization barrier to impede synchronization of one or more synchronizing parameters of one of the layers during a second window of the training; and
   impede the synchronization of the one or more synchronizing parameters of the one of the layers during the second window if the synchronization barrier policy is modified to include the synchronization barrier.

2. The system of claim 1, wherein the one or more synchronizing parameters of the layers include one or more of weights or biases of the layers, and the scheduler is to conduct the first timing measurement to determine a respective blockage timing of each of the layers of the neural network during forward propagation of the first window.

3. The system of claim 2, wherein the scheduler is to determine that the synchronization barrier policy is to be modified to include the synchronization barrier, and the scheduler is to:
   modify the synchronization barrier policy to add the synchronization barrier to be between another of the layers, that has a longest blockage timing from among the respective blockage timings, and the one of the layers; and
   during the second window of the training and based upon the synchronization barrier policy, prevent synchronization of the one or more synchronizing parameters of the one of the layers until the another of the layers has completed synchronization of one or more synchronizing parameters of the another of the layers.

4. The system of claim 3, wherein the scheduler is to:
   conduct a second timing measurement of another blockage timing during the second window of the training of the neural network, the another blockage timing to measure a time that processing is impeded at the layers of the neural network during the second window of the training due to synchronization of one or more synchronizing parameters of the layers;
   determine whether a second total blockage timing of the second timing measurement is greater than a first total blockage timing of the first timing measurement; and
   remove the synchronization barrier from the synchronization barrier policy when the second total blockage timing is determined to be greater than the first total blockage timing.

5. The system of claim 1, wherein the scheduler is to:
   determine that a synchronization barrier is to be implemented between first and second layers of the layers;
   modify the synchronization barrier policy to add the synchronization barrier between the first and second layers; and
   during another window of the training, stop synchronization of one or more synchronizing parameters of the second layer until synchronization of one or more synchronizing parameters of the first layer is completed.

6. The system of claim 1, wherein the scheduler is to:
   maintain a history data structure including a plurality of elements, each element of the history data structure including a respective total blockage timing during a respective window of the training and a synchronization barrier added based upon the respective window; and
   remove synchronization barriers of the synchronization barriers from the synchronization barrier policy based upon a comparison of total blockage timings during windows of the training to the respective total blockage timings maintained in the history data structure.

7. A scheduling apparatus for a neural network, comprising:
   a substrate; and
   logic coupled to the substrate and implemented at least partly in one or more of configurable logic or fixed-functionality logic hardware, the logic to:
   conduct a first timing measurement of a blockage timing of a first window of training of the neural network, the blockage timing to measure a time that processing is impeded at layers of the neural network during the first window of the training due to synchronization of one or more synchronizing parameters of the layers;
   based upon the first timing measurement, determine whether to modify a synchronization barrier policy to include a synchronization barrier to impede synchronization of one or more synchronizing parameters of one of the layers during a second window of the training; and
   impede the synchronization of the one or more synchronizing parameters of the one of the layers during the second window if the synchronization barrier policy is modified to include the synchronization barrier.

8. The apparatus of claim 7, wherein the one or more synchronizing parameters of the layers include one or more of weights or biases of the layers, and the logic is to conduct the first timing measurement to determine a respective blockage timing of each of the layers of the neural network during forward propagation of the first window.

9. The apparatus of claim 8, wherein the logic is to determine that the synchronization barrier policy is to be modified to include the synchronization barrier, and the logic is to:

modify the synchronization barrier policy to add the synchronization barrier to be between another of the layers, that has a longest blockage timing from among the respective blockage timings, and the one of the layers; and during the second window of the training and based upon the synchronization barrier policy, prevent synchronization of the one or more synchronizing parameters of the one of the layers until the another of the layers has completed synchronization of one or more synchronizing parameters of the another of the layers.

10. The apparatus of claim 9, wherein the logic is to:

conduct a second timing measurement of another blockage timing during the second window of the training of the neural network, the another blockage timing to measure a time that processing is impeded at the layers of the neural network during the second window of the training due to synchronization of one or more synchronizing parameters of the layers;

determine whether a second total blockage timing of the second timing measurement is greater than a first total blockage timing of the first timing measurement; and remove the synchronization barrier from the synchronization barrier policy when the second total blockage timing is determined to be greater than the first total blockage timing.

11. The apparatus of claim 7, wherein the logic is to:

determine that a synchronization barrier is to be implemented between first and second layers of the layers;

modify the synchronization barrier policy to add the synchronization barrier between the first and second layers; and during another window of the training, stop synchronization of one or more synchronizing parameters of the second layer until synchronization of one or more synchronizing parameters of the first layer is completed.

12. The apparatus of claim 7, wherein the logic is to:

maintain a history data structure including a plurality of elements, each element of the history data structure including a respective total blockage timing during a respective window of the training and a synchronization barrier added based upon the respective window; and remove synchronization barriers of the synchronization barriers from the synchronization barrier policy based upon a comparison of total blockage timings during windows of the training to the respective total blockage timings maintained in the history data structure.

13. A method of training a neural network, comprising:

conducting a first timing measurement of a blockage timing of a first window of the training of the neural network, the blockage timing to measure a time that processing is impeded at layers of the neural network during the first window of the training due to synchronization of one or more synchronizing parameters of the layers;

based upon the first timing measurement, determining whether to modify a synchronization barrier policy to include a synchronization barrier to impede synchronization of one or more synchronizing parameters of one of the layers during a second window of the training; and impeding the synchronization of the one or more synchronizing parameters of the one of the layers during the second window if the synchronization barrier policy is modified to include the synchronization barrier.

14. The method of claim 13, wherein the one or more synchronizing parameters of the layers include one or more of weights or biases of the layers, and the conducting includes measuring a respective blockage timing of each of the layers of the neural network during forward propagation of the first window.

15. The method of claim 14, wherein the determining includes determining that the synchronization barrier policy is to be modified to include the synchronization barrier, the method further including:

modifying the synchronization barrier policy to add the synchronization barrier to be between another of the layers, that has a longest blockage timing from among the respective blockage timings, and the one of the layers; and during the second window of the training and based upon the synchronization barrier policy, preventing synchronization of the one or more synchronizing parameters of the one of the layers until the another of the layers has completed synchronization of one or more synchronizing parameters of the another of the layers.

16. The method of claim 15, further comprising:

conducting a second timing measurement of another blockage timing during the second window of the training of the neural network, the another blockage timing to measure a time that processing is impeded at the layers of the neural network during the second window of the training due to synchronization of one or more synchronizing parameters of the layers;

determining whether a second total blockage timing of the second timing measurement is greater than a first total blockage timing of the first timing measurement; and removing the synchronization barrier from the synchronization barrier policy when the second total blockage timing is determined to be greater than the first total blockage timing.

17. The method of claim 13, further comprising:

determining that a synchronization barrier is to be implemented between first and second layers of the layers;

modifying the synchronization barrier policy to add the synchronization barrier between the first and second layers; and during another window of the training, stopping synchronization of one or more synchronizing parameters of the second layer until synchronization of one or more synchronizing parameters of the first layer is completed.

18. The method of claim 13, further comprising:

maintaining a history data structure including a plurality of elements, each element of the history data structure including a respective total blockage timing during a respective window of the training and a synchronization barrier added based upon the respective window; and removing synchronization barriers of the synchronization barriers from the synchronization barrier policy based upon a comparison of total blockage timings during windows of the training to the respective total blockage timings maintained in the history data structure.

19. At least one computer readable storage medium comprising a set of instructions, which when executed, cause a computing system to:

conduct a first timing measurement of a blockage timing of a first window of training of a neural network, the blockage timing to measure a time that processing is impeded at layers of the neural network during the first window of the training due to synchronization of one or more synchronizing parameters of the layers;

based upon the first timing measurement, determine whether to modify a synchronization barrier policy to include a synchronization barrier to impede synchronization of one or more synchronizing parameters of one of the layers during a second window of the training; and impede the synchronization of the one or more synchronizing parameters of the one of the layers during the second window if the synchronization barrier policy is modified to include the synchronization barrier.

20. The at least one computer readable storage medium of claim 19, wherein the one or more synchronizing parameters of the layers include one or more of weights or biases of the layers, and the instructions, when executed, cause the computing system to conduct the first timing measurement to determine a respective blockage timing of each of the layers of the neural network during forward propagation of the first window.

21. The at least one computer readable storage medium of claim 20, wherein the synchronization barrier policy is to be modified to include the synchronization barrier, and wherein the instructions, when executed, cause the computing system to:

modify the synchronization barrier policy to add the synchronization barrier to be between another of the layers, that has a longest blockage timing from among the respective blockage timings, and the one of the layers; and during the second window of the training and based upon the synchronization barrier policy, prevent synchronization of the one or more synchronizing parameters of the one of the layers until the another of the layers has completed synchronization of one or more synchronizing parameters of the another of the layers.

22. The at least one computer readable storage medium of claim 21, wherein the instructions, when executed, cause the computing system to:

conduct a second timing measurement of another blockage timing during the second window of the training of the neural network, the another blockage timing to measure a time that processing is impeded at the layers of the neural network during the second window of the training due to synchronization of one or more synchronizing parameters of the layers;

determine whether a second total blockage timing of the second timing measurement is greater than a first total blockage timing of the first timing measurement; and remove the synchronization barrier from the synchronization barrier policy when the second total blockage timing is determined to be greater than the first total blockage timing.

23. The at least one computer readable storage medium of claim 19, wherein the instructions, when executed, cause the computing system to:

determine that a synchronization barrier is to be implemented between first and second layers of the layers;

modify the synchronization barrier policy to add the synchronization barrier between the first and second layers; and during another window of the training, stop synchronization of one or more synchronizing parameters of the second layer until synchronization of one or more synchronizing parameters of the first layer is completed.

24. The at least one computer readable storage medium of claim 19, wherein the instructions, when executed, cause the computing system to:

maintain a history data structure including a plurality of elements, each element of the history data structure including a respective total blockage timing during a respective window of the training and a synchronization barrier added based upon the respective window; and remove synchronization barriers of the synchronization barriers from the synchronization barrier policy based upon a comparison of total blockage timings during windows of the training to the respective total blockage timings maintained in the history data structure.

25. The at least one computer readable storage medium of claim 19, wherein the instructions, when executed, cause the computing system to implement the synchronization barrier to stop synchronization of gradients of the one or more synchronizing parameters of the one of the layers until synchronization of gradients of one or more synchronizing parameters of another of the layers is complete during the second window.

* * * * *